Dec. 9, 1930.  A. E. PITTMAN  1,784,313
COMBINED COTTON BLOCKER AND CULTIVATOR
Filed Oct. 29, 1928  4 Sheets-Sheet 1
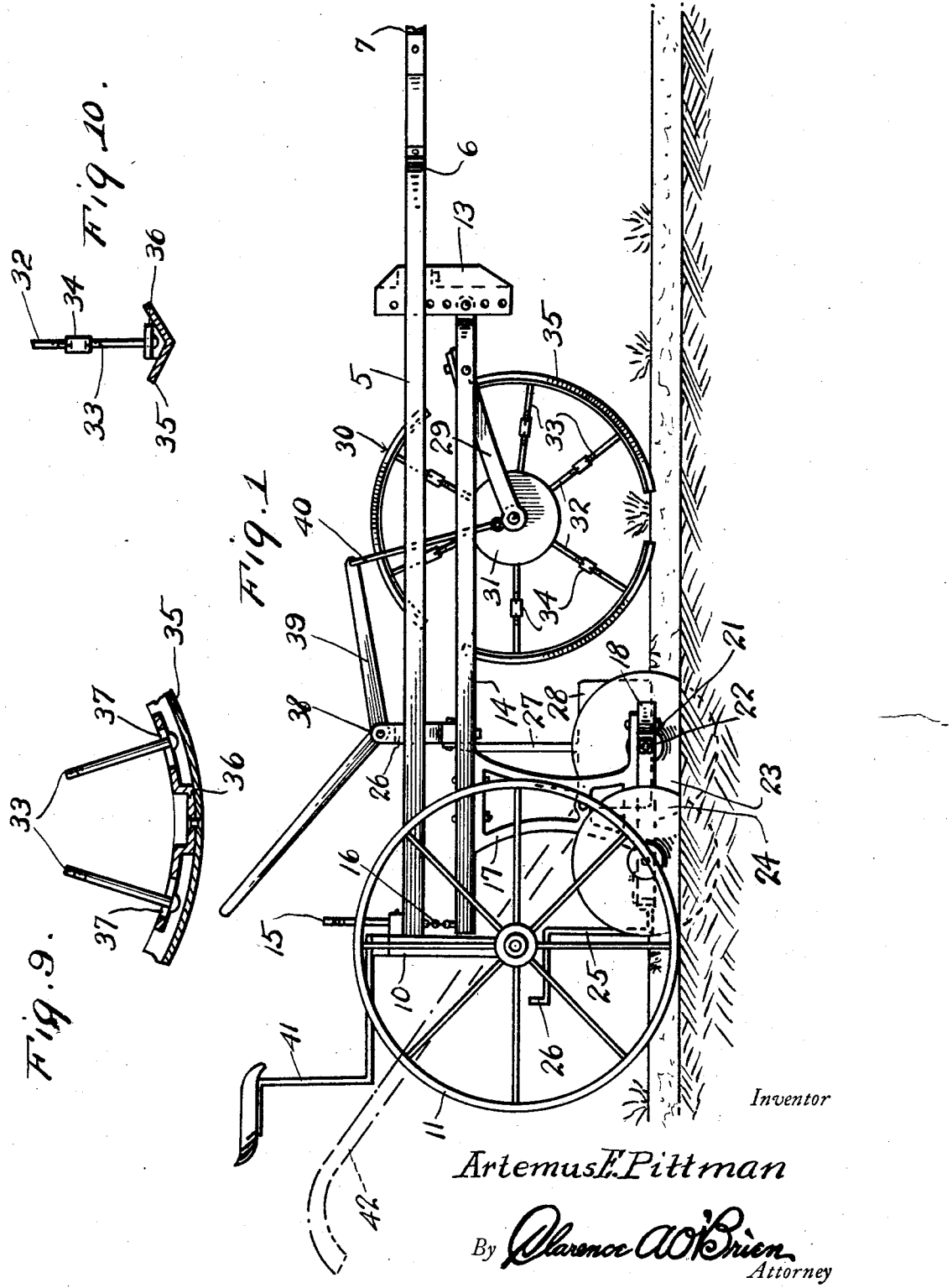
Inventor
*Artemus E. Pittman*
By *Clarence A. O'Brien*
Attorney

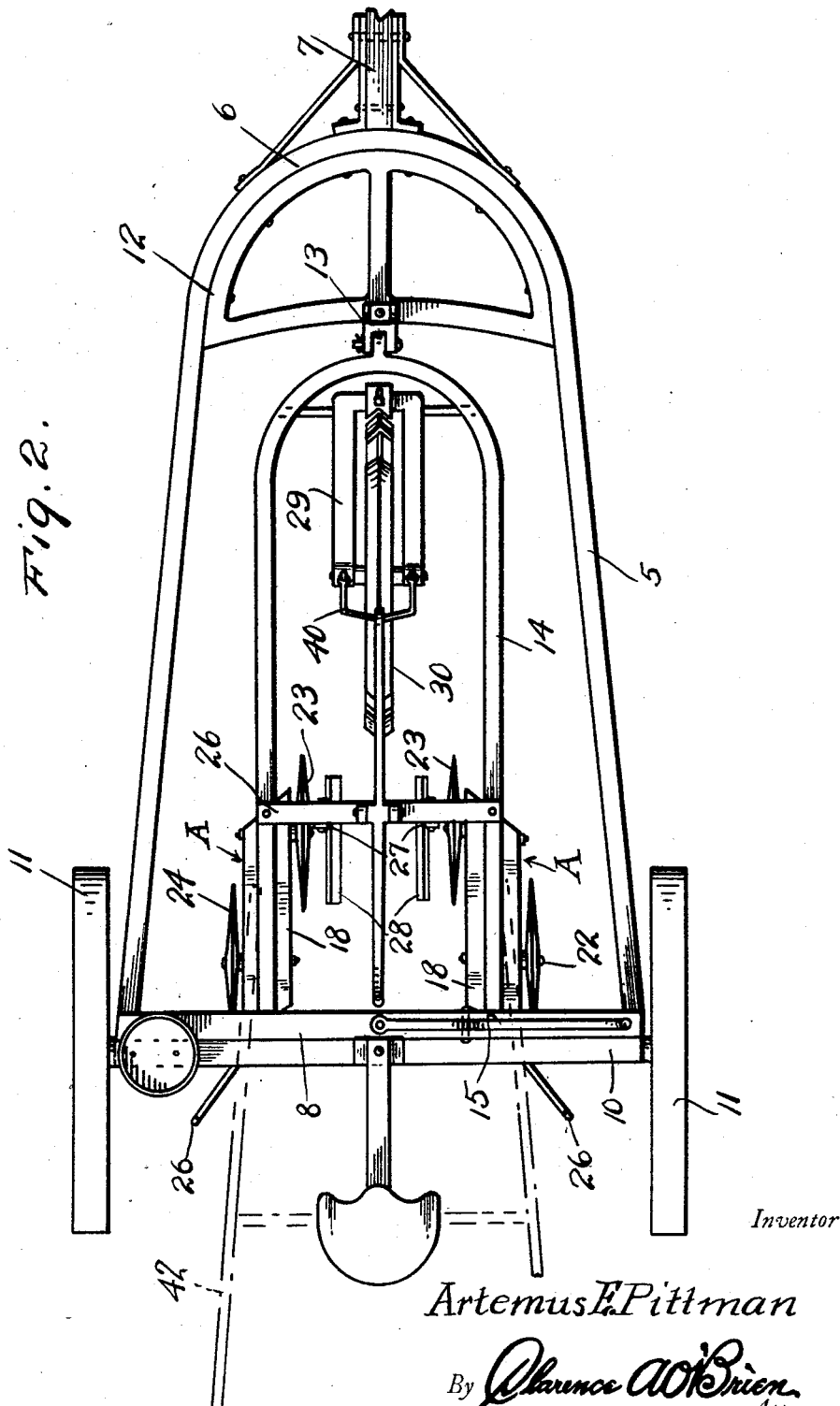

Dec. 9, 1930.                A. E. PITTMAN                1,784,313
              COMBINED COTTON BLOCKER AND CULTIVATOR
                  Filed Oct. 29, 1928      4 Sheets-Sheet 3
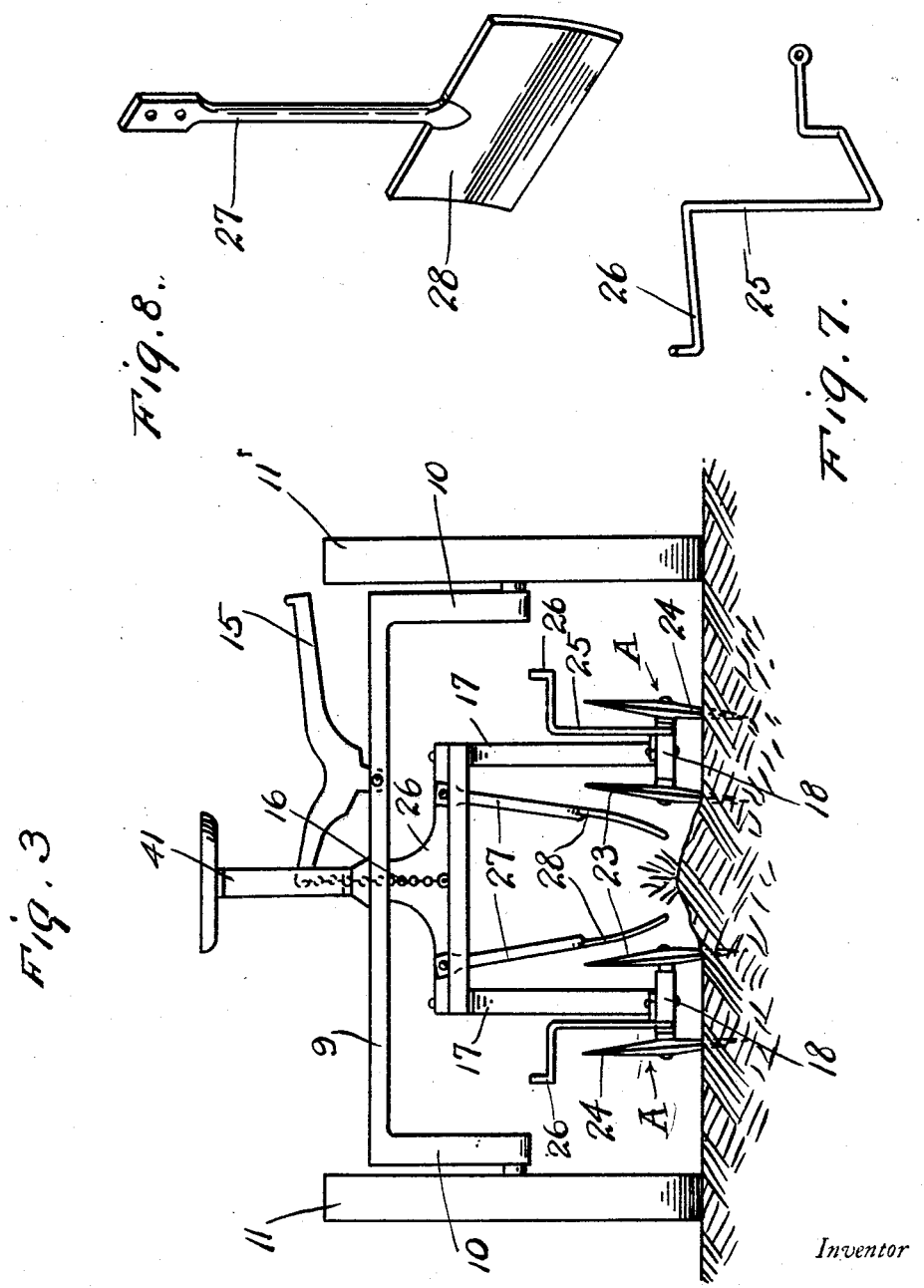
Inventor
*Artemus E. Pittman*
By *Clarence A. O'Brien*
                              Attorney

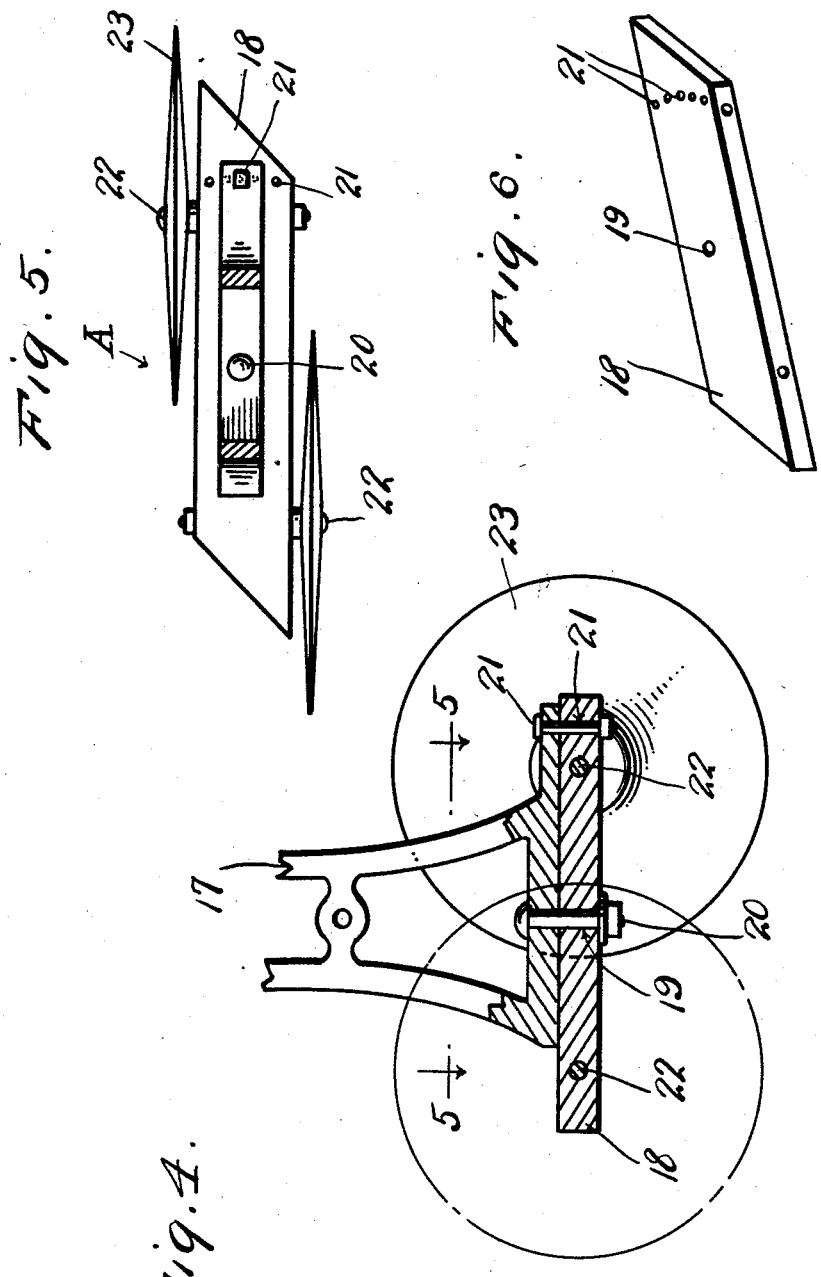

Patented Dec. 9, 1930

1,784,313

UNITED STATES PATENT OFFICE

ARTEMUS ERASTUS PITTMAN, OF MUSCOGEE, FLORIDA

COMBINED COTTON BLOCKER AND CULTIVATOR

Application filed October 29, 1928. Serial No. 315,827.

This invention relates to new and useful improvements in agricultural machines, and aims to provide an implement that embodies both cotton blocking and cotton cultivating means so that both operations can be performed simultaneously. Furthermore, the machine is of unusually simple construction, as well as highly efficient in its operation. Furthermore, the cotton blocking unit per se is adjustable so that the space between the unblocked or unpressed plants may be regulated, depending upon the particular nature of the plants. Furthermore, the structure of the machine is such that the blocking mechanism may be entirely removed so that the implement may be employed as a cultivator only.

Further than this a suitable fertilizer distributor or seed planting device may be associated with the implement in lieu of the blocking mechanism if desired.

The invention further aims to provide a combined implement of this character that may be used as a riding or walking blocker and cultivator.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a side elevation of my improved implement.

Figure 2 is a top plan view thereof.

Figure 3 is a rear end elevation of the machine.

Figure 4 is a fragmentary view partially in elevation and partially in cross section of one of the cultivator disc units.

Figure 5 is a detail longitudinal section through the unit taken substantially upon the line 5—5 of Figure 4 and looking downwardly in the direction of the arrows.

Figure 6 is a top side perspective of the disc carrying plate of one of the units.

Figure 7 is a perspective of one of the unit combined foot rest and pressure levers.

Figure 8 is an inner side perspective of the preferred type of plant protector blade one of which is located at the inner side of each cultivator unit to prevent the unblocked plants from being covered by the furrow.

Figure 9 is a fragmentary longitudinal section through the rim portion of the blocker wheel, and Figure 10 is a fragmentary transverse section therethrough.

Now having particular reference to the drawing, my novel implement consists of a main frame 5 composed of side bars that diverge slightly toward their rear ends, the front ends being joined by a curved bight portion 6, while secured to the forward end of this frame is a suitable draft tongue 7, the rear ends of the side bars of the frame 5 are joined by a transverse frame bar 8, while associated with this rear transverse bar 8 is a stationary axle bar 9 having depending ends 10—10 with which are associated supporting wheels 11—11. Within the forward end of the frame 5 is a segmental moon shaped brace 12, while secured to the rear portion thereof and intermediate its ends is a vertically extending clevis 13. Adjustably pivotally secured to this clevis 13 within the frame 5 is an elongated U-shaped sub-frame 14. Pivoted to the main frame cross bar 8 is a foot lever 15, one end of which is connected to the sub-frame 14 by a chain or cable 16 so that when pressure is applied to the outer end of this foot lever, the rear end of the sub-frame 14 will be elevated for a purpose presently to be described. Rigidly bolted to and depending from the side legs of the sub-frame 14 adjacent the rear ends thereof are hangers 17—17 of a pair of cultivator units designated generally A, A. Arranged upon the lower end of each hanger 17 is a somewhat elongated plate 18 formed centrally with an opening 19 whereby to facilitate the swivel association of the plate with the hanger through the medium of a swivel pin 19. Adjacent the forward end of each plate 18 the same is formed transversely with a curved row of spaced openings 21 to facilitate the securing of the plate with respect to the hanger 17 at a predetermined angle through the medium of a bolt or pin connection 22 extended through the lower end of the hanger and a predetermined opening in said plate. Arranged transversely through the front and rear ends of each plate 18 are cultivator disc supporting pins 22—22, while arranged upon the inner end of each forward pin is a cultivator disc 23 and upon the outer end of each rearmost pin is a cultivator disc 24. As illustrated in Figure 3, these discs are preferably canted to cut inwardly toward the cotton plant, the size of the furrows being regulated by the angle of the unit plates 18. Obviously, when the sub-frame 14 is raised these cultivator discs will be drawn out of engagement with the earth.

Associated with the rear end of each plate 18 of the units A is an upwardly extending pressure lever 25, the upper end of each of which is provided with a foot rest bar 26. The pressure of the operator's feet against these levers will control the depth of the cut of the cultivator disc.

Arranged transversely of the side legs of the sub-frame 14 forwardly of the hanger 17 is a bar 26, while secured thereto inwardly of the side legs of said frame are depending blade shafts 27, the lower end of each of which is equipped with a protector blade 28 disposed inwardly of the foremost cultivator discs to prevent the earth from being turned over upon the unblocked plant.

The plant blocking mechanism consists of a U-shaped wheel hanger 29 pivoted at its forward opposed end within the forward end of the sub-frame 14, while supported between the ends of the legs is a blocker wheel 30. This wheel consists of a hub 31 from which radiate spoke sections 32, the outer ends thereof being threaded, and being secured to similar spoke sections 33 through the medium of turn buckles 34. The outer ends of these spoke sections 33 are headed as illustrated in Figure 9. Furthermore, the blocker wheel consists of a plurality of rim sections 35 of relatively wide V-shape in cross section as illustrated in Figure 10. Arranged upon the inner concave face of each rim section 35 intermediate the ends thereof is a longitudinally extending strap 36, the opposite ends of these straps being offset inwardly so as to have spaced relation with the inner faces of the sections, as clearly illustrated in Figure 9. Furthermore, the ends of these straps are longitudinally slotted as at 37 for receiving the ends of adjacent spoke sections 33.

By adjusting the turn buckles 34, the space between the ends of adjacent pin sections may be increased or diminished to increase or decrease the space between the unblocked plant as illustrated in Figure 1. Obviously, as the wheel moves over the plant, certain ones thereof will be crushed into the earth, while those passing between the spaces of the wheel rim will be unharmed. Pivoted to a suitable vertical support 38 attached to the sub-frame cross bar 26 intermediate the ends thereof is a bell crank lever 39, the forward end of which is connected to the rear end of the wheel hanger 29 by a yoke 40, and obviously the downward swinging movement of the rear end of this lever will raise the blocker wheel from the earth surface.

Preferably the machine is equipped with an operator seat 41 at the rear end thereof, but if desired, control handles 42—42 may be detachably associated with the hanger 17 of the cultivator units so that the device may be employed as a walking implement.

In view of the foregoing description when considered in conjunction with the accompanying drawing it will be apparent that I have provided a novel, simple and efficient combined cotton blocker and cultivator, even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In an agricultural machine of the character described, a main frame, a pair of supporting wheels at the rear end of the frame, draft attaching means at the forward end of the frame, a sub-frame arranged beneath said main frame, a vertically adjustable pivotal connection between the forward end of the sub-frame and said main frame, means at the rear end of said sub-frame whereby it may be raised or lowered, earth working elements associated with and depending from the opposite sides of the sub-frame, a blocking unit located at the forward end of and intermediate the sides of said sub-frame, said blocking units consisting of a wheel including a hub portion, spokes radiating therefrom, and segmental rim sections associated with the outer ends of the spokes, and having spaced relation at their ends to provide spaces within the rim of the wheel.

2. In an agricultural machine of the class described, a main wheel supported frame, a sub-frame, a vertically adjustable pivotal connection between the forward end of the main frame and said sub-frame, hangers depending from opposite sides of said sub-frame at the rear end of said sub-frame, plates swively mounted on the lower ends of said hangers, means for retaining said plates at a predetermined angle with respect to said hangers, cultivator disks carried by said plates, said disks being disposed one at each end of said plates at opposite sides of the respective plates, means for raising and lowering the free end of said sub-frame for regulating the cutting depth of said disks, a wheel mount pivoted in the forward end of said sub-frame, a radially expansible blocker wheel rotatably supported in said wheel mount, and means for raising and lowering the free end of said wheel mount independently of said sub-frame.

3. In an agricultural machine of the class described, a main wheel supported frame, a sub-frame, a vertically adjustable pivotal connection between the forward end of the sub-frame and said main frame, hangers extending downwardly from opposite sides of said sub-frame at the rear end of said sub-frame, cultivator discs mounted on the lower end portion of said hangers, means for mounting said disks on the lower ends of said hangers, said last mentioned means including means for retaining said disks at a predetermined angle with respect to said hangers, said disks being canted to turn inwardly toward the cotton plant, and whereby the sides of the furrows made by said disks may be regulated by the angularity of the disks with respect to said hangers, means for actuating said sub-frame for controlling the cutting depth of said discs, a wheel mount pivotally mounted in the forward end of said sub-frame, a radially expansible blocker wheel rotatably supported in said wheel mount, means for raising or lowering the free end of said wheel mount independently of said sub-frame, said wheel embodying circumferentially spaced rim sections.

4. In an agricultural machine of the class described, a main wheel supported frame, a sub-frame, a vertically adjustable pivotal connection between the forward end of the main frame and said sub-frame, hangers depending from opposite sides of said sub-frame at the rear end of said sub-frame, plates swively mounted on the lower ends of said hangers, means for retaining said plates at a predetermined angle with respect to said hangers, cultivator disks carried by said plates, said disks being disposed one at each end of said plates at opposite sides of the respective plates, means for raising and lowering the free ends of said sub-frame for regulating the cutting depth of said disks, a wheel mount pivoted in the forward end of said sub-frame, a radially expansible blocker wheel rotatably supported in said wheel mount, and means for raising and lowering the free end of said wheel mount independently of said sub-frame, the disk of the forward end of said plate being arranged on the inner disposed sides of said plate, protector blades, and means for mounting said protector blades in operative relation to the foremost cultivator disk of the respective plates for shielding unblocked plants from the earth acted upon during the cutting action of said disk.

In testimony whereof I affix my signature.
ARTEMUS ERASTUS PITTMAN.